2,950,299
SURFACE ACTIVE SUBSTANCES OF ETHER ESTER CLASS

Willard H. Kirkpatrick, Sugar Land, Tex., assignor to Visco Products Company, Houston, Tex., a corporation of Delaware No Drawing. Filed Jan. 6, 1958, Ser. No. 707,116

13 Claims. (Cl. 260—407)

This invention relates to novel high molecular weight acidic ether esters of a surface active nature effective in treating emulsion systems primarily to cause demulsification of water-in-oil petroleum emulsions.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

An object of the present invention is to provide a novel reagent which is water-wettable, interfacial and surface active in order to enable its use as a demulsifier or for such uses where surface active characteristics are necessary or desirable. Other objects will appear hereinafter.

The novel substances provided in accordance with this invention are high molecular weight monomeric acidic ether esters of polymeric fatty acids containing a plurality of carboxylic acid groups condensed with polyoxyethylene-polyoxypropylene compounds having a terminal hydroxy group.

Among the preferred polyoxyalkylene-polyoxypropylene compounds having a terminal hydroxy group are the polyoxyethylene-polyoxypropylene glycols having a molecular weight range of more than 1,000 but not more than about 7,500. One class of the polyoxyalkylene compounds useful for the purpose of this invention is herein referred to as heteric polyoxyalkylene glycols which have the general structure $$HO(OC_nH_{2n})_xH$$

where $n$ is both two and three in a single molecule and $x$ is equal to the sum of the number of times $n$ has a value of two plus the number of times $n$ has a value of three. The weight ratio of oxyethylene groups to oxypropylene groups is preferably within the range of from 1:6 to not more than about 4:1 and the ethylene oxide groups constitute from 8% to about 75% and preferably not in excess of 50% by weight of the total polyoxyalkylene portion of the molecule and the molecular weight of the diol is in excess of 1,000.

Another sub-class of polyoxyalkylene glycols of interest in the practice of this invention is herein referred to as symmetric polyoxyethylene-polyoxypropylene glycols and have the general structure $$HO(C_2H_4O)_z(C_3H_6O)_y(C_2H_4O)_zH$$

where the total molar weight ratio of oxyethylene groups to oxypropylene groups is within the range of from 1:6 to 9:1. In the above sub-class the minimum molecular weight attributable to both oxyethylene and oxypropylene groups is at least 1,000, $y$ equals at least 15 and $(C_2H_4O)_{z+z}$ equals 4 to 90% of the total weight of the oxypropylene groups in the molecule.

The preparation of the heteric polyoxypropylene-polyoxyethylene glycols useful as starting materials for the preparation of the monomeric acidic ether esters of this invention has been described in U.S. 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand, and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30° C. to a maximum of approximately 60° C. to 65° C. These solid products are miscible with water in all proportions.

The compositions of this invention wherein oxyethylene and oxypropylene groupings are present either in a heretic or symmetric sequence possess characteristics which cannot be secured by a simple blending of polyoxyethylene compounds with polyoxypropylene compounds. It is possible within such a given molecule to secure a molecular weight from 3,000 to 20,000 where the product remains liquid at normally prevailing temperatures. Such products are miscible in water and in oils. The water solubility, however, decreases as the temperature is raised and at higher temperatures two-phase systems result. These characteristics are unusual and striking and would not be anticipated by careful consideration of the characteristics of polyoxyethylene glycols and polyoxypropylene glycols.

The preferred compositions of the heteric class contemplated for use in accordance with this invention are exemplified by the following structural formula:

$$R'(OC_nH_{2n})_xR$$

wherein R' is an acyl radical of an organic polycarboxy acid and R is either hydroxy or an oxyacyl radical, with the further understanding that where R is an oxyacyl radical the terminal ester groups may be the same or different; $n$ is both 2 and 3 in a single molecule and $x$ is equal to the sum of the number of times $n$ has a value of 2 plus the number of times that $n$ has a value of 3 and the maximum ratio of n having a value of 2 to $n$ having a value of 3 is such that the maximum weight ratio of oxyethylene to oxypropylene does not exceed 4:1, it being further understood that the molecular weight of said composition attributable to both the oxyethylene and the oxypropylene groups is in excess of 1,000.

Other illustrative compositions provided in accordance with the invention have the same general formula, where R′, $n$, and $x$ have the same significance and R is oxyalkyl, oxyaralkyl, oxycycloalkyl, oxyaryl, secondary or tertiary aminoalkyl, secondary or tertiary aminoaralkyl or secondary or tertiary aminoaryl.

The symmetric class of polyoxyalkylene polyols used in preparing the compositions of this invention are cogeneric mixtures of conjugated polyoxypropylene-polyoxyethylene compound containing in their structure oxypropylene groups, oxyethylene groups, and an organic radical derived from an organic compound containing a plurality of reactive hydrogen atoms. The symmetrical polyoxyalkylene polyols are differentiated from those hereinbefore described as heteric in that all of the oxypropylene groups are present in polyoxypropylene chains attached to the organic radical at the site of a reactive hydrogen atom. Such a molecular arrangement constitutes a polyoxypropylene polymer. The average minimum molecular weight of this polyoxypropylene polymer is about 900 and may be in excess of 2,500. The oxyethylene groups are attached to the polyoxypropylene polymers through additional condensations which result in a nearly symmetrical configuration. Because of the configuration, this class of polyoxyethylene-polyoxypropylene diols are herein referred to as symmetrical.

While any polyfunctional compound containing more than one reactive hydrogen atom may be used as the initiating molecule in the preparation of the base polyoxypropylene polymer it is preferred to use a low molecular weight aliphatic diol such as 1,2-propane diol or propylene glycol. By using such a starting material and the appropriate amounts of a propylene oxide and ethylene oxide preferred polymers of the following structural formula may be prepared:

$$HO-(C_2H_4O)_x(C_3H_6O)_y(C_2H_4O)_z-H$$

where $y$ equals at least 15; and $(C_2H_4)_{z+x}$ equals 4 to 90% of the weight of the total polyoxyalkylene groups in the molecule.

The symmetric polyoxyalkylene polyols and their modes of preparation are set forth in detail in Lundsted, U.S. Patent 2,674,619, the disclosure of which is incorporated herein by reference. It will be understood, however, that the limitation therein as to the percent by weight amounts of oxyethylene groups to the polyoxypropylene groups is not intended as a limitation of the present invention.

The heteric polyoxyalkylene compounds employed in producing the monomeric acidic esters of this invention can also be monoethers of polyoxyalkylene glycols having a nucleus in accordance with the herein described chemical structure and as disclosed, for example, in U.S. Patent 2,425,755. The terminal hydrocarbon group of the nucleus can be alkyl, alkenyl, aralkyl, aralkenyl, cycloalkyl or aryl. Thus, one mol of any of the monoethers in the aforesaid patent having the required reactive hydrogen group and chemical structure as set forth herein can be esterified with a high molecular weight polyfunctional acid of the class hereinafter described in greater detail. When the terminal hydrocarbon group is one of the class named, the resultant product is a monoester of a polyoxyalkylene-polyoxypropylene diol monoether.

It will be apparent that the products of the invention can be monoesters of polyoxyalkylene diols derived by the reaction of one mol of the diol with one mol of the later described organic polycarboxylic acids without driving the reaction to completion so that the resultant product contains, illustratively, one ester group, a terminal hydroxyl group and a terminal carboxyl group. The products of the invention can also be monomeric diesters of polyoxyalkylene diols obtained by esterifying one mol of the diol with two mols of an organic polycarboxylic acid so that the resultant product contains, for example, two ester groups, two or more terminal carboxyl groups and only one polyoxyalkylene unit. Additionally, products of this invention can also be produced by further esterifying the condensation product of one mol of a polyoxyalkylene diol with one mol of a dimer acid or its equivalent in an amount equivalent in weight to two mols of the thus described product with one mol of diglycolic acid. If the initial polyalkylene compounds containing a free hydroxyl group have an ether group, for example, on the opposite end of the chain, one ester group can be formed from one mol of a dicarboxylic acid and one mol of the polyoxyalkylene compound and the resultant ester will have a terminal ether group and a terminal carboxyl group. The compositions of the invention can also consist of mixtures of esters, as, for example, mixtures of monomeric monoesters and monomeric diesters. The substitution of hydrogen by halogen, nitro, hydroxyl, sulfonic and similar groups in either of the ether or acyl radical does not depart from the scope of this invention for simple substitution products of this nature have been found to be equally satisfactory for the purpose as outlined herein.

It is not intended that the foregoing lists each and every polyoxyalkylene ester composition that will satisfactorily resolve water-in-oil emulsions in accordance with this invention, for it will be obvious to those skilled in the art that certain mixed derivatives as apparent from the foregoing would function satisfactorily and in fact are contemplated by the present invention.

Another essential reactive component of the novel surface active agents to which this invention is directed is the polymeric fatty acids containing from 34 to 36 carbon atoms in the polycarboxylic acid. The polymeric fatty polycarboxylic acids useful for the purpose of this invention are prepared in general by the polymerization of unsaturated fatty acids. Often the polymeric fatty polycarboxylic acids of this invention are referred to as dimer acids inasmuch as a large percentage of these acids, as are procured commercially, are dimers of unsaturated fatty monocarboxylic acids. Preparation of the polymeric fatty acids has been described in various publications. Among these are Industrial and Engineering Chemistry, vol. 32, page 802, et subs. (1940); Goebel in U.S. Patent 2,482,761, and more recently Landis in U.S. Patent 2,632,695. Illustrative of the polymeric polycarboxylic acids are those made from linoleic acid, linolenic acid and mixtures thereof as are derivatively obtained from the drying and semi-drying oils of commerce including linseed oil, soybean oil, dehydrated castor oil, etc. Polymeric fatty polycarboxylic acids, hereinafter specifically referred to in the examples, include polymer acid No. 16 which is recovered as a by-product from the caustic fusion and distillation (still residue) of castor oil in the manufacture of sebacic acid. Polymer acid No. 16 contains about 15% by weight of polymerized fatty acids having a molecular weight of about 360 to 600 and the balance thereof having a molecular weight in excess of 600, the average molecular weight being about 1,000 and the acid possesses, on the average, slightly less than two carboxyl groups per molecule. Polymer acid No. 15 has been prepared in accordance with a process described in Goebel, supra, starting with soybean oil fatty acids. Polymer acids No. 15 and No. 16 containing at least two unsaturated linkages are primarily dicarboxylic acids and contain from about 34 to 36 carbon atoms. These acids are available from commercial sources and typical properties of these acids, as reported by these sources, are set out below in Table I.

TABLE I

| | Polymer Acid No. 15 | Polymer Acid No. 16 |
|---|---|---|
| Acid Value | 180 (Min.) | 150 |
| Saponification Value | 185 (Min.) | 172 |
| Unsaponifiable Matter | 2.0 (Max.) | 3.7 |
| Neutralization Equivalent | 290–310 | |
| Color (Gardner) | 10 (Max.) | |
| Iodine No | | 36 |
| Moisture Content | | 0.80 |

The monomeric acidic ether esters of this invention resulting from the esterification of polyoxyethylene-polyoxypropylene glycols with polymeric fatty polycarboxylic acids containing from 34 to 36 carbon atoms, the components of which have been described more fully above, are characterized as being surface active and water-wettable. Since they possess at least one residual free carboxylic acid group they are ionizable to yield organic anions.

The esters of the invention are prepared in accordance with recognized and established procedures for such synthesis. No novelty is intended in the two methods which have been found useful for the preparation of the products of this invention. In a first method the polyoxyalkylene polyol, the polymeric fatty polycarboxylic acid, esterification catalyst, which may be acidic in nature, and solvent, usually in aromatic solvent such as benzene, xylene or toluene, are weighed out in the proper molar proportions and placed in a reaction flask fitted with a condenser and Dean-Stark or sidearm water trap. The solvent assists in water removal and temperature control. The reaction mixture is heated under reflux conditions until approximately the theoretical amount of water is collected. For the uses of the present invention, it is not material if small or residual amounts of unreacted polycarboxylic acid are included. As soon as the theoretical amount of water is collected, the reaction is generally stopped. In solvent cooking the temperature of the reaction is controlled, in part, by the boiling point of the hydrocarbon solvent selected. Progress of the reaction can be determined by a well known means such as following the acid value and the amount of water collected in the sidearm trap. After the reaction has been completed the solvent may be removed, if desired, by vacuum distillation. Other methods of recovery of the esters are apparent to those skilled in the art.

A second method which is also useful is referred to sometimes as a fusion method inasmuch as no solvent is employed. In this method the appropriate molar quantities of the reactants are heated together in the presence of a catalyst, preferably under 15 to 20 mm. of vacuum, until the reaction is essentially complete. Temperatures useful for carrying the reaction to completion fall within the range of from 100° to about 160° C. Temperatures greater than 160° C., for example 250° C., can also be employed under inert atmospheres.

Catalysts for esterification are well known and while it is preferred to use a soluble, acidic, organic catalyst such as lauryl sulfuric acid, other organic and inorganic esterification catalysts are not without their usefulness. From about 0.1% to about 1% of the catalyst by weight of the active ingredients has been found useful. It is possible, however, to conduct esterification reactions without the use of catalysts.

As the principal end use of the compositions of this invention is for the purposes of demulsification, the presence of a small quantity of excess or residual free acid in the product ester is not objectionable. Solvent processing is preferred although the fusion method is also useful. Both symmetric and unsymmetrical esters can be prepared by the methods described and the resulting compositions are effective in demulsifying water-in-oil emulsions. Further, it has been noted that both monomeric mono- and monomeric diesters of carboxylic acids of the class herein described are effective as demulsifiers where one or more of the carboxyl groups remain unreacted.

Since, as indicated above, it is possible to prepare the compositions of this invention by various routes and from a number of different classes of starting materials the invention should not be limited by the following examples which are merely intended to illustrate satisfactory procedures for preparing a few of the many materials suitable for employment within the scope of the present invention. In the following examples the parts are by weight unless otherwise indicated.

*Example I*

150 parts of a symmetric oxyethylated polyoxypropylene glycol having a molecular weight in the range of 2,000 to 3,000 (Pluronic L-64 Wyandotte), 100 parts of polymer acid No. 16 of average molecular weight of 1,000 and 50 parts of an $SO_2$ extract hydrocarbon fraction were heated together in a closed vessel equipped with heating element, agitator, condenser and sidearm trap. At 214° C. an aqueous distillate condensed in the sidearm trap. After 90 minutes and a top temperature of 254° C., 1.9 parts water were recovered. The monomeric acidic ether ester recovered was diluted further with 55 parts, in addition, of the $SO_2$ extract hydrocarbon for demulsification use.

*Example II*

In equipment similar to that described in Example I, 220 parts of a polyoxyethylene-polyoxypropylene diol of the symmetric class containing 35 mols of oxypropylene groups and four mols of oxyethylene as terminal groups were reacted with 120 parts by weight of polymer acid No. 15 in 50 parts hydrocarbon solvent as in Example I. Water began to distill over at 207° C. At the end of two hours of gradually increasing temperature 3.6 parts water were collected. A portion of the acidic ether ester was used for demulsification.

Another portion of the product was further condensed with the still-bottoms from distillation of triethanolamine in hydrocarbon solvent at 171° C. to 257° C. for 4½ hours. 9.6 parts water were liberated and collected. This product was further thinned with hydrocarbon solvent for demulsification use and was effective for this purpose.

*Example III*

In equipment similar to that described in Example I, 220 parts of the symmetric polyoxyethylene-polyoxypropylene diol of Example II were reacted with 60 parts of dimer acids No. 15 in 100 parts of solvent ($SO_2$ extract) hydrocarbon distillate. Between 221° and 257° C. over a three hour period, 1.9 parts aqueous distillate were recovered. To the first reaction product, subsequent to cooling, was added 13 parts of diglycolic acid. Upon again heating to a top of 247° C. 1.8 parts of aqueous distillate were recovered. The final mixed acidic ether-ester was reduced with 300 parts of additional $SO_2$ extract hydrocarbon for use as a demulsifier.

*Example IV*

In a suitable reaction vessel fitted with agitator, condenser, Dean-Stark trap, and provided with means of heating, is placed 500 parts of a monobutyl ether of a heteric polyoxyalkylene diol having a molecular weight of 5,000 as prepared in accordance with procedure described in U.S. Patent 2,425,755, 100 parts of polymer acid No. 15 and 100 parts of an $SO_2$ extract volatile hydrocarbon solvent are also added, the reaction mixture is heated at a temperature in excess of 200° C. until approximately 1.8 parts of water have been collected in the sidearm trap. The product obtained is a monoether-monoester composition having a free residual carboxyl group.

Example V

In a flask similar to that described for Example IV is placed 850 parts of a monobutyl ether of a heteric polyoxyalkylene diol having a molecular weight of approximately 1,700 (prepared similarly as described in Example IV) and 500 parts of VR–I acids (similar to polymer acid No. 16) and 100 parts of an $SO_2$ hydrocarbon solvent extract. The mixture is heated and the aqueous distillate collected in the sidearm trap. Approximately 9 parts of aqueous distillate is collected at a temperature not in excess of 300° C. The yield is a monomeric acidic dimer acid ester of the monobutyl heteric diol ether.

Example VI

To 220 parts of a heteric polyoxyalkylene diol having a molecular weight of 2,200 (wherein the oxypropylene groups constitute 25% by weight and the oxyethylene groups 75% by weight of the oxyalkylene groups present) contained in a reaction flask as described above, there is added 200 parts of polymer acid No. 16 and 100 parts of a suitable hydrocarbon solvent (such as $SO_2$ extract). Approximately 3.5 parts of water were collected in the sidearm trap to substantially esterify both hydroxyl groups of the starting diol to yield a composition having substantially two available carboxyl groups per mol of product. The resultant ether-ester was diluted with an additional 400 parts of the same solvent used in processing to facilitate ultimate use of the product as a demulsifying agent.

Example VII

A symmetrical polyoxyalkylene glycol was prepared by reacting 35 mols of 1,2-propylene oxide to give a product having a molecular weight of approximately 2,000. Into this initial reaction product are incorporated four mols of ethylene oxide to produce a product having a central portion consisting of oxypropylene groups and terminal portions consisting of oxyethylene groups, the amount of ethylene oxide in a product being approximately 8% by weight. In a suitable reaction vessel as described in the previous examples, 675 parts of the diol produced as described are reacted at 225° C. under $CO_2$ with 600 parts of polymer acid No. 16 until 10 parts by weight of aqueous distillate have been eliminated from the reaction mass. The monomeric acidic diester product is further diluted with 600 lbs. of a volatile hydrocarbon solvent ($SO_2$ extract) for ease in handling.

Example VIII

In an open kettle 4,500 lbs. of a symmetrical oxyethylated polyoxypropylene glycol having a molecular weight of approximately 2,000 is mixed with 5,000 parts of polymer acid No. 16 and the substantially monomeric diester of said glycol formed by heating at 200° C. under an inert gas cover in accordance with the fusion technique hereinbefore described. The resultant acidic diester composition is thereafter reduced with a substantial quantity of a volatile petroleum hydrocarbon solvent containing approximately 10% of isopropanol to yield a fluid product capable of being handled by pumping.

Example IX

A fusion technique similar to that described in Examples VII and VIII is followed. In this example, however, a chemically equivalent amount of a symmetric oxyethylated polyoxypropylene glycol containing 35 mols of 1,2-propylene oxide further condensed with 8 mols of ethylene oxide is used in place of the previously identified polyoxyalkylene glycol and condensed with the polycarboxylic polymeric fat acids. The substituted glycol of this example contains about 15% by weight of ethylene oxide. Approximately four mols of the ethylene oxide are condensed with each of the terminal hydroxyls of each of the polyoxypropylene chains on either end of the described intermediate product. The resultant product is essentially a diester of a symmetric oxyethylated polyoxypropylene glycol.

Example X

Glycerine is condensed with 1,2-propylene oxide in a ratio of 51 parts of 1,2-propylene oxide per part of glycerine. To each part of the resultant intermediate material is added 0.6 parts of ethylene oxide to produce a symmetrical oxyethylated-oxypropylated glycerine having a molecular weight of about 4,000 to about 4,500. Uniquely, this product is soluble in water and in oil in all proportions. 4,250 parts of the polyoxyalkylated product described above is condensed with 1,000 parts of No. 15 acid at a temperature above 160° C. but not appreciably above 200° C. and until the acid value of the reaction product indicates consumption of one-half of the acid groups originally present.

Example XI

The same as in Example X except 2,000 parts of No. 15 acid are used in conjunction with 4,250 parts of the diol of Example X. Reaction conditions are maintained until approximately one-half of the original acid present has been reacted.

By way of illustrating the remarkable effectiveness of the products contemplated by this invention, the method of testing their efficiency in bottle tests will be described and exemplary data given, and this will be followed by the results of a full scale plant test.

FIELD BOTTLE TEST I

Field bottle tests were made on samples of emulsified oil taken from the Cayuga Field in East Texas. A sample grindout showed that these emulsions contained about 70 parts of water per 100 parts of emulsion. The oil being treated in this field had a gravity of about 28° A.P.I. A gun barrel system was being used in the field and the oil was being treated at an approximate temperature of 160° C.

One hundred (100) cc. samples were taken and placed in conventional field test bottles. A test with another chemical which was being used to treat the oil commercially indicated that about 0.06 cc. of a 10% solution of the treating chemical was required per 100 cc. of sample. In testing the composition of the present invention the treatment employed was at the rate of one gallon of the treating chemical to 250 barrels of net oil, that is, oil after the removal of the water.

After the test chemical was added, the samples which were placed in the test bottles were shaken 200 times at atmospheric temperatures and subsequently agitated an additional 100 times at a temperature of 140° F. After shaking in each instance, the water drop was determined and recorded, that is to say, the amount of water which separated from the emulsion. The color and sheen or brilliance of the oil was also observed and recorded at the same time. After agitation at elevated temperatures, the samples were maintained at 160° C. to permit settling and stratification of the water.

The samples were secured just after the oil came from the well and every effort was made to maintain conditions comparable to those present in a full scale plant treatment. After agitating, the samples were allowed to settle and were tested for water drop at predetermined periods of time and were recorded on suitable tests sheets.

The test showed that an ester composition, prepared in accordance with this invention, caused 69 of the 70 parts of water to separate before the bottles were given hot agitation. After settling 30 minutes at 160° F., substantially all of the water had separated indicating that the emulsion had been resolved satisfactorily.

PLANT SCALE TEST

This test was made by actually testing the oil from the production from a well in the Cayuga, Texas, Field. The treating system comprised of the separator, gun barrel and a chemical proportioning pump to add the chemical treating agent.

The treating agent employed was a monoester-monoether of a heteric polyoxyalkylene compound having a terminal hydroxyl group similar to that prepared in Example IV above. The treatment was started at 2:30 and was observed for 72 hours. During the first 24 hours the rate of chemical injection was adjusted so that the chemical consumption was about two gallons per day, which compared favorably with another treating agent which had previously been used in this plant system. During the 3 day test the oil was treated satisfactorily with the oil going to stock at from 0.4 to 1.0 percent BS&W which is substantially below the pipeline specifications for the given field. The treating ratio was one gallon chemical per 160 barrels of oil. The treatment was continued and found to be entirely satisfactory.

In the previous description, frequent reference has been made to heteric and symmetric polyoxyalkylene diols. By the word "heteric" is meant that the diol constituents of the mixture vary in internal configuration from molecule to molecule, such variations arising out of a randomness of the distribution of the oxyethylene and oxypropylene groups therein, as results, for example, from the concurrent reaction of the ethylene oxide and the propylene oxide on the starting material and the intermediate products. Use of the term "symmetric" has been previously explained.

Where the 1,2-propylene oxide is first reacted to form a long chain polyoxypropylene polyol which is subsequently reacted with ethylene oxide, the resultant compositions are referred to, as hereinbefore explained, as symmetric polyoxyethylene-polyoxypropylene polyols.

It will be apparent from the foregoing description that the polyoxyalkylene compounds containing a free or unreacted hydroxyl group which are employed as starting materials preferably contain a minimum of about 8% by weight of ethylene oxide and a maximum of 75% by weight of ethylene oxide. In most instances, the proportion of ethylene oxide will not exceed 50% by weight of said polyoxyalkylene compounds.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Alkenyl—a monovalent radical derived from an unsaturated aliphatic hydrocarbon, as, for example, ethenyl (vinyl), alkyl, undecenyl, octadecenyl, linolenyl, and their homologues, preferably containing 2 to 18 carbon atoms and having a single double bond;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aralkenyl—a monovalent radical derived from an aromatic substituted unsaturated aliphatic hydrocarbon, as, for example, styryl, cinnamyl, and homologues;

Aryl—a monovalent radical derived from an aromatic hydrocarbon by removal of one hydrogen atom, as, for example, phenyl and naphthyl;

Acyl—a radical derived from an organic polycarboxy acid by the removal of a hydroxy group as, for example, phthaloyl, maleyl, malonyl, adipoyl and succinoyl;

Oxyalkyl—a monovalent radical derived from an aliphatic alcohol by removal of the hydrogen atom of an alcoholic hydroxyl, as, for example, methoxy, ethoxy, propyloxy, octyloxy, cetyloxy, myricyloxy, and homologues thereof, preferably containing 1 to 30 carbon atoms;

Oxyaralkyl—a monovalent radical derived from an aralkyl alcohol by removal of the hydrogen atom of an alcoholic hydroxyl, as, for example, —O—CH$_2$C$_6$H$_5$, —O—C$_2$H$_4$C$_6$H$_5$, oxypropylphenyl, oxybutylphenyl, oxyoctylphenyl, oxycetylphenyl, oxyoctadecylphenyl, and homologues thereof, preferably containing 1 to 30 carbon atoms in the alkyl chain;

Oxyaryl—a monovalent radical derived from a phenol by removal of the hydrogen of the phenolic hydroxy, as, for example, phenoxy, naphthoxy, and homologues thereof;

Oxycycloalkyl—a monovalent radical derived from a cycloaliphatic alcohol by removal of the hydrogen of the alcoholic hydroxy, as, for example, cyclopentyloxy, cyclohexyloxy, cycloheptyloxy, and homologues;

Oxyacyl—a monovalent radical having the structure

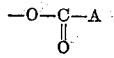

where

represents an acyl group, as, for example, the formic acid ester, acetic acid ester, ricinoleic acid ester, other fatty acid esters, diglycolic acid esters, phthalic acid esters, tallol esters, succinic acid esters, abietic acid ester, other resin acid esters, trimethylhexanoic acid ester, esters formed from alcoholysis products of castor oil, and homologues thereof;

Secondary aminoalkyl—a monovalent radical derived by the removal of hydrogen from a nitrogen atom of a primary alkyl amine, as, for example, methylamino, ethylamino, butylamino, and higher homologues;

Tertiary aminoalkyl—a monovalent radical derived by the removal of hydrogen from a nitrogen atom of a secondary alkyl amine, as, for example, dimethylamino, diethylamino, diisopropyl amino, dibutylamino and higher homologues;

Halogen—one of the atoms chlorine, bromine, iodine or fluorine;

Halide—a salt containing a halogen atom as the anion.

The following specific compositions may be mentioned as illustrative of compositions provided in accordance with the invention:

(I) The monomeric acidic esters obtained by reacting dimer acids or their equivalents with heteric polyoxyalkylene glycols in which the oxyalkylene groups consist essentially of oxyethylene groups and 1,2-oxypropylene groups and the weight ratio of oxyethylene to oxypropylene does not exceed 4:1, the minimum amount of oxyethylene being approximately 8% by weight.

(II) The monomeric acidic esters obtained by condensing one mol of a dimer acid or its equivalent with one mol of either a heteric or symmetric polyoxylalkylene glycol having a molecular weight of more than 1,000 and less than about 7,500 wherein the weight ratio of oxyethylene groups to oxypropylene groups is not more than about 4:1 and the molar ratio of the dimer acid (or equivalent) to the glycol is in the range of 1:1 to 2:1.

(III) The monomeric acidic esters obtained by first condensing one mol of a dimer acid or its equivalent with one mol of a heteric or symmetric polyoxyethylene-polyoxypropylene diol having a molecular weight of more than 1,000 and less than about 7,500 wherein the weight ratio of the oxyethylene groups to oxypropylene groups is not more than about 4:1 and the oxyethylene groups are not less than about 8% of the total oxyalkylene groups and further condensing two mols of the resultant product with one mol of diglycolic acid.

In the compositions of the invention, one mol of a dimer acid or its equivalent when reacted with one mol of a monoether of a polyoxyalkylene glycol containing both oxyethylene and oxypropylene groups in either heteric or symmetric pattern will produce monoesters having one free carboxyl group. In the event one mol of a polyoxyalkylene diol of either heteric or symmetric pattern containing both oxyethylene and oxypropylene groups is reacted with one mol of a dimer acid or its equivalent, the product is essentially a monoester containing both free or unreacted carboxyl and hydroxyl groups. If two mols of polycarboxylic acids of this invention are reacted with one mol of the symmetric or heteric diols hereinbefore described, two ester groups may be formed and the final composition contain at least substantially double the quantity of free carboxyl groups. It will also be apparent that cogeneric mixtures may also be formed during the course of the reaction containing both monomeric mono- and monomeric diesters. The predominant components of these mixtures are monomeric in the sense that they have no repetition of the polyol unit. The expression "a monomeric acidic ester" is used throughout the specification and claims to cover single esters as well as mixtures of esters.

The demulsifying compositions are preferably employed in the proportion of 1 part of reagent to from 2,000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling range or boiling point in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the mid-continent oil fields, including Oklahoma, Illinois, Kansas, the Gulf Coast, Louisiana, Southwest Texas and California.

This application is directed toward subject matter which was required to be divided from my copending application Serial No. 99,333, filed June 15, 1949, now abandoned. This application is a continuation-in-part of my copending application Serial No. 676,917, filed August 8, 1957, which in turn is a continuation-in-part of Serial No. 498,767, filed April 1, 1955, now abandoned, which in turn is a continuation-in-part of Serial Nos. 98,162, filed June 9, 1949, now abandoned, and 99,333, filed June 15, 1949.

The invention is hereby claimed as follows:

1. A monomeric acidic ester of a dimerized higher fatty acid containing from 34 to 36 carbon atoms and a polyoxyalkylene compound having a terminal hydroxy group in which the major proportion of the molecular weight of said polyoxyalkylene compound consists of oxyethylene and oxypropylene groups, the weight ratio of oxyethylene to oxypropylene not exceeding about 4:1, the weight percentage of oxyethylene in said ester being at least 8% by weight of the total weight of oxyethylene and oxypropylene, the minimum molecular weight attributable to both oxyethylene and oxypropylene groups being at least about 1,000, and the maximum molecular weight attributable to both oxyethylene and oxypropylene groups being 7500, the molar ratio of the said acid to said polyoxyalkylene compound is not less than about 1:1 nor more than about 2:1.

2. The composition as claimed in claim 1 in which the dimerized higher fatty acid is a derivative of the caustic fusion and dry distillation of castor oil in the manufacture of sebacic acid.

3. The composition as claimed in claim 1 in which the dimerized higher fatty acid is the dimer acid derived from soybean oil.

4. A monomeric acidic ether ester of a dimerized higher fatty acid containing from 34 to 36 carbon atoms and a polyoxyethylene-polyoxypropylene diol having a molecular weight of more than 1,000 and less than about 7,500 wherein the weight ratio of oxyethylene groups to oxypropylene groups is not more than about 4:1 and not less than about 1:6 and the molar ratio of said dimerized acid to said polyoxyalkylene diol is about 1:1.

5. A monomeric acidic ether ester of a dimerized higher fatty acid containing from 34 to 36 carbon atoms and a polyoxyalkylene-polyoxypropylene diol having a molecular weight of more than 1,000 and less than about 7,500 wherein the weight ratio of oxyethylene groups to oxypropylene groups is not more than about 4:1 and not less than about 1:6 and the molar ratio of said dimerized acid to said polyoxyalkylene diol is about 2:1.

6. A monomeric acidic ester of a dimerized higher fatty acid containing from 34 to 36 carbon atoms and a heteric polyoxyalkylene compound of the structure

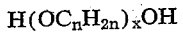

$$H(OC_nH_{2n})_xOH$$

where $n$ is both two and three in a single molecule and $x$ is equal to the sum of the number of times $n$ has a value of two plus the number of times $n$ has a value of three, the weight ratio of oxyethylene groups to oxypropylene groups within a range not exceeding about 4:1 or less than about 1:6, the minimum molecular weight attributable to the oxyethylene and oxypropylene groups being at least 1,000, the maximum molecular weight attributable to the oxyethylene and oxypropylene groups being not more than 7,500, and the molar ratio of said acid to said polyoxyalkylene compound being not less than 1:1 nor more than 2:1.

7. A monomeric acidic ester of a dimerized higher fatty acid containing from 34 to 36 carbon atoms and a symmetric polyoxyalkylene compound having the structure

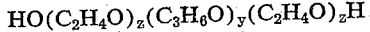

$$HO(C_2H_4O)_z(C_3H_6O)_y(C_2H_4O)_zH$$

where the total weight ratio of oxyethylene groups to oxypropylene groups is within a range of 1:6 and 9:1 and the weight percentage of ethylene oxide to propylene oxide in the total molecule is from about 8% to not more than about 90% by weight of the total weight of the oxypropylene groups, and the molar ratio of said acid to said polyoxyalkylene compound is not less than 1:1 nor more than 2:1.

8. A monomeric acidic ether ester of a dimerized higher fatty acid containing from 34 to 36 carbon atoms and a heteric polyoxyethylene-polyoxypropylene diol of the structure

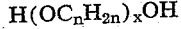

$$H(OC_nH_{2n})_xOH$$

where $n$ is both two and three in a single molecule and $x$ is equal to the sum of the number of times $n$ has a value of two plus the number of times $n$ has a value of three, the weight ratio of oxyethylene groups to oxypropylene groups in the total molecule is within the range of from 1:6 to about 4:1 and the molar ratio of said dimerized acid to said polyoxyalkylene diol is within the range of from about 1:1 to about 2:1.

9. A monomeric acidic ether ester of a dimerized higher fatty acid containing from 34 to 36 carbon atoms and a symmetric polyoxyalkylene diol of the structure

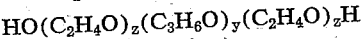

$$HO(C_2H_4O)_z(C_3H_6O)_y(C_2H_4O)_zH$$

where the total weight ratio of ethylene oxide groups to propylene oxide groups is within the range of from 1:6 to 9:1 and the molecular weight of said diol is more than 1,000 and less than about 7,500, and the molar ratio of said dimerized acid to said polyoxyalkylene diol is from about 1:1 to about 2:1.

10. A monomeric acidic ester of diglycolic acid and the dimer higher fatty acid ester of a polyoxyalkylene-polyoxypropylene diol having a molecular weight of more than 1,000 and less than about 7,500, wherein the weight ratio of oxyethylene to oxypropylene groups in the diol is not more than about 4:1 and not less than about 1:6 and the molar ratio of diglycolic acid to said polyoxyalkylene diol is about 1:2 and the molar ratio of the dimer acids to said diol is about 1:1, said dimerized higher fatty acid containing 34 to 36 carbon atoms.

11. A monomeric acidic ester of a dimerized higher fatty acid containing from 34 to 36 carbon atoms and a monoether of a polyoxyethylene-polyoxypropylene diol having a molecular weight of more than 1,000 and less than about 7,500, wherein the weight ratio of oxyethylene groups to oxypropylene groups is not more than about 4:1 and not less than about 1:6 and the molar ratio of said polymeric acid to said monoether is about 1:1.

12. A compound having the following structure $$R^1(OC_nH_{2n})_xR$$

wherein $R^1$ is the acyl radical of a dimerized higher fatty acid containing from 34 to 36 carbon atoms, R is an oxyacyl radical of a dimerized fatty acid containing from 34 to 36 carbon atoms, $n$ is both two and three in a single molecule, $x$ is equal to the sum of the number of times $n$ is two plus the number of times $n$ is three, the molecular weight attributable to $—(OC_nH_{2n})_x—$ being in excess of 1,000, the minimum weight attributable to the oxyethylene groups being at least 8%, the maximum weight ratio of oxyethylene to oxypropylene not exceeding 4:1 and the molecular weight of the compound being within the range of 1,500 to 7,500.

13. A compound having the following structural formula $$R^1O(C_2H_4O)_z(C_3H_6O)_y(C_2H_4O)_zR$$

wherein $R^1$ is an acyl radical and R is an oxyacyl radical of a dimerized higher fatty acid containing from 34 to 36 carbon atoms, $y$ equals at least 15, and the weight of the oxyethylene groups is not less than 4% but not more than 90% of the weight of the oxypropylene groups in the molecule.

References Cited in the file of this patent

UNITED STATES PATENTS

| | | |
|---|---|---|
| 2,295,165 | De Groote | Sept. 8, 1942 |
| 2,562,878 | Blair | Aug. 7, 1951 |
| 2,695,914 | De Groote | Nov. 30, 1954 |

UNITED STATES PATENT OFFICE
CERTIFICATION OF CORRECTION

Patent No. 2,950,299            August 23, 1960

Willard H. Kirkpatrick

It is hereby certified that error appears in the above numbered patent requiring correction and that the said Letters Patent should read as corrected below.

Column 3, line 46, for "$(C_2H_4)_{z+x}$" read -- $(C_2H_4O)_{z+z}$ --.

Signed and sealed this 2nd day of May 1961.

(SEAL)
Attest:

ERNEST W. SWIDER
Attesting Officer

DAVID L. LADD
Commissioner of Patents